United States Patent
Nakashima et al.

(10) Patent No.: US 8,224,524 B2
(45) Date of Patent: Jul. 17, 2012

(54) VEHICLE AND CONTROL METHOD OF THE SAME

(75) Inventors: Issei Nakashima, Unzen (JP); Toshio Fuwa, Nissin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 423 days.

(21) Appl. No.: 12/525,101

(22) PCT Filed: Dec. 3, 2007

(86) PCT No.: PCT/JP2007/073739
§ 371 (c)(1),
(2), (4) Date: Jul. 30, 2009

(87) PCT Pub. No.: WO2008/096500
PCT Pub. Date: Aug. 14, 2008

(65) Prior Publication Data
US 2010/0023220 A1    Jan. 28, 2010

(30) Foreign Application Priority Data
Feb. 2, 2007   (JP) ................................ 2007-024269

(51) Int. Cl.
*B60G 17/016* (2006.01)
(52) U.S. Cl. ........... 701/38; 701/124; 180/280; 700/245
(58) Field of Classification Search .................... 701/38, 701/41, 42, 70, 72, 124; 700/245; 180/280
See application file for complete search history.

(56) References Cited

U.S. PATENT DOCUMENTS

| | | | | |
|---|---|---|---|---|
| 6,789,640 B1 * | 9/2004 | Arling et al. | .................. | 180/282 |
| 6,815,919 B2 * | 11/2004 | Field et al. | ..................... | 318/587 |
| 6,948,576 B2 * | 9/2005 | Angeles | .......................... | 180/23 |
| 7,004,271 B1 * | 2/2006 | Kamen et al. | .................. | 180/21 |
| 7,273,116 B2 * | 9/2007 | Kamen et al. | .................. | 180/21 |
| 7,635,041 B2 * | 12/2009 | Adachi | ........................ | 180/218 |

(Continued)

FOREIGN PATENT DOCUMENTS

| | | |
|---|---|---|
| JP | 2-70561 | 3/1990 |
| JP | 10-11140 | 1/1998 |
| JP | 2003-325587 | 11/2003 |
| JP | 2004-510637 | 4/2004 |
| JP | 2004-345608 | 12/2004 |
| JP | 2005-212671 | 8/2005 |
| JP | 2006-1384 | 1/2006 |

(Continued)

*Primary Examiner* — Helal A Algahaim
(74) *Attorney, Agent, or Firm* — Finnegan, Henderson, Farabow, Garrett & Dunner, LLP (57) ABSTRACT

A vehicle includes first and second rotary bodies in contact with a road surface. The vehicle also includes a rotation sensor that detects a rotational state of each of the first and second rotary bodies. Additionally, the vehicle includes a turning sensor that detects a physical quantity representing a turning state of the vehicle on the road surface. The vehicle also includes a calculation unit that calculates a predicted value of a turning parameter representing a turning amount of the vehicle by use of a difference between first and second physical quantities which represent the rotational states of the first and second rotary bodies. In addition, the vehicle includes a slip detection unit that detects occurrence of a slip of the first or second rotary body by comparing the predicted value with an actual measured value of the turning parameter obtained by receiving an output signal of the turning sensor.

12 Claims, 6 Drawing Sheets

U.S. PATENT DOCUMENTS

| | | | |
|---|---|---|---|
| 7,649,331 B2 * | 1/2010 | Hosoda et al. | 318/568.12 |
| 7,690,447 B2 * | 4/2010 | Kamen et al. | 180/21 |
| 7,866,429 B2 * | 1/2011 | Ishii et al. | 180/218 |
| 7,979,179 B2 * | 7/2011 | Gansler | 701/38 |
| 2003/0036818 A1 * | 2/2003 | Hattori et al. | 700/245 |
| 2003/0155167 A1 * | 8/2003 | Kamen et al. | 180/272 |
| 2003/0184071 A1 * | 10/2003 | Tokumaru et al. | 280/758 |
| 2004/0162636 A1 * | 8/2004 | Hattori et al. | 700/245 |
| 2005/0228539 A1 * | 10/2005 | Takenaka et al. | 700/245 |
| 2005/0272550 A1 * | 12/2005 | Kroppe | 475/116 |
| 2006/0097683 A1 * | 5/2006 | Hosoda et al. | 318/568.12 |
| 2006/0243499 A1 * | 11/2006 | Hosoda | 180/8.5 |
| 2008/0035395 A1 * | 2/2008 | Kamen et al. | 180/21 |
| 2008/0164083 A1 * | 7/2008 | Miki et al. | 180/165 |
| 2010/0030397 A1 * | 2/2010 | Tachibana et al. | 701/1 |

FOREIGN PATENT DOCUMENTS

| | | |
|---|---|---|
| JP | 2006-1385 | 1/2006 |
| JP | 2006-14404 | 1/2006 |
| JP | 2006-136962 | 6/2006 |
| JP | 2006-290195 | 10/2006 |
| WO | WO 02/30730 A2 | 4/2002 |

* cited by examiner

VEHICLE AND CONTROL METHOD OF THE SAME

CROSS-REFERENCE TO RELATED APPLICATIONS

This application is a national phase application of International Application No. PCT/JP2007/073739, filed Dec. 3, 2007, and claims the priority of Japanese Application No. 2007-024269, filed Feb. 2, 2007, the contents of both of which are incorporated herein by reference.

TECHNICAL FIELD

The present invention relates to a vehicle which travels with two or more rotary bodies that are rotationally driven. In particular, the present invention relates to an inverted pendulum type vehicle which includes a body supported by two or more rotary bodies so as to be swingable in the back-and-forth direction of the vehicle in a traveling state, and which performs an inverted state stabilization control for maintaining an inverted state of the body and a control for traveling in the back-and-forth direction by using a tilt angle or the like of the body as an input variable.

BACKGROUND ART

An inverted pendulum type vehicle herein described refers to a vehicle which includes a body and two or more rotary bodies (such as wheels) coupled to the body, the body being coupled to the rotary bodies so that the body can be tilted in the back-and-forth direction of the vehicle, and which can be moved by rotation of the rotary bodies while maintaining a state where the center-of-mass of the body or the center-of-mass of a total mass obtained by combining masses of objects such as the body and a passenger supported on the body is positioned upward of the position of the rotation center of each of the rotary bodies, that is, maintaining the inverted state of the body. Such an inverted pendulum type vehicle is disclosed in Patent Documents 1 and 2, for example.

An apparatus disclosed in Patent Document 1 is an inverted pendulum type vehicle including two or more wheels and a body supported by these wheels. Further, the body includes a pair of getting-on decks which extend in a traveling direction orthogonal to a direction of an axle connecting the centers of the two or more wheels, and on which the left and right feet of a passenger are respectively placed. Furthermore, a control for traveling of the vehicle is performed based on the detection results of a tile angle each of the pair of getting-on decks in the pitch direction (around the axle) and a tilt angle thereof in the roll direction (about the anterior-posterior axis of the vehicle that is in parallel to the traveling direction).

An apparatus disclosed in Patent Document 2 is a mobile robot including a coaxial two-wheeled mobile mechanism which controls a forward thrust using an inverted pendulum control. Further, the mobile robot is structured so that the upper body of the robot can be autonomously swung and tilted in the roll direction (about the anterior-posterior axis of the mobile robot that is in parallel to the forward thrust direction), and controls a swing posture so that a location of an intersection of a line extending a composite vector of a centrifugal force and a gravitational force acting on the center-of-mass of the mobile robot and a ground surface (road surface) supporting wheels is kept in an area between the left and right wheels. The structure for moving the center-of-mass suppresses overturn of the mobile robot or occurrence of a slip of the wheels due to the centrifugal force generated during a steep turn and an inclination of a road surface.

[Patent Document 1] Japanese Unexamined Patent Application Publication No. 2006-1384
[Patent Document 2] Japanese Unexamined Patent Application Publication No. 2006-136962

DISCLOSURE OF INVENTION

Technical Problems

When a slip occurs between rotary bodies such as wheels supporting an inverted pendulum type vehicle and a road surface, an unpredicted behavior such as a steep turn on the road surface is caused, and trouble occurs during the inverted state stabilization control for maintaining the inverted state of the body and the control for traveling in the back-and-forth direction. For this reason, it is desirable for the inverted pendulum type vehicle to be able to promptly detect the occurrence of a slip of the rotary bodies and rapidly perform processing for eliminating a slip according to the detection results.

Patent Document 2 described above discloses that the center-of-mass is moved by tilting the upper body (body) of the robot in the roll direction, to thereby enable suppression of the occurrence of a slip during a turn or traveling on the road surface, but fails to disclose a mechanism for detecting the occurrence of a slip of the wheels or a mechanism for eliminating a slip in response to the detection of the slip.

The present invention has been made in view of the above-mentioned circumstances, and therefore has an object to provide a vehicle capable of performing processing for eliminating a slip by detecting the occurrence of a slip between rotary bodies and a road surface, and a control method of the vehicle.

Technical Solution

According to a first aspect of the present invention, a vehicle includes first and second rotary bodies in contact with a road surface, and a body supported by the first and second rotary bodies, the first and second rotary bodies being arranged so that a straight line connecting between a contact where the first rotary body and the road surface are in contact with each other and a contact where the second rotary body and the road surface are in contact with each other is non-parallel to a back-and-forth direction of the vehicle, and being rotationally driven in the back-and-forth direction of the vehicle. Further, the vehicle includes a rotation sensor that detects a physical quantity representing a rotational state of each of the first and second rotary bodies, and outputs a signal corresponding to a magnitude of the detected physical quantity; a turning sensor that detects a physical quantity representing a turning state of the vehicle on the road surface with which the first and second rotary bodies are in contact, and outputs a signal corresponding to a magnitude of the detected physical quantity; a calculation unit that calculates a predicted value of a turning parameter representing a turning amount of the vehicle by use of an output signal of the rotation sensor; and a slip detection unit that detects occurrence of a slip of the first or second rotary body by comparing the predicted value with an actual measured value of the turning parameter obtained by receiving an output signal of the turning sensor. This structure enables detection of the occurrence of a slip of the vehicle, and enables execution of control for eliminating the slip in response to the detection of the slip.

Note that, as the physical quantity representing the rotational state detected by the rotation sensor, the number of rotations, a rotational direction, a rotation angle, a rotation angular velocity, a rotation angular acceleration, and the like of each of the first and second rotary bodies are used as appropriate. For example, in the mode for the invention 1 described later, encoders 17L and 17R each correspond to the rotation sensor according to the first aspect of the present invention, and rotation angles $\theta_L$ and $\theta_R$ of wheels 10L and 10R each correspond to the physical quantity representing the rotational state. Further, as the physical quantity representing the turning state detected by the turning sensor, the number of turns, a turning direction, a turning angle, a turning angular velocity, a turning angular acceleration, and the like are used as appropriate. For example, in the mode for the Invention 1 described later, a rate gyro 18 corresponds to the turning sensor according to the first aspect of the present invention, and a turning angular velocity $\omega_M$ of a vehicle 1 corresponds to the physical quantity representing the turning state.

According to a vehicle of a second aspect of the present invention, in the vehicle according to the first aspect of the present invention, the turning parameter is a turning angle or a turning angular velocity of the vehicle with a virtual axis perpendicular to the road surface as a center.

According to a vehicle of a third aspect of the present invention, in the vehicle according to the first aspect of the present invention, the rotation sensor is an encoder that detects an amount of rotation, a rotation angle, or a rotational position of each of the first and second rotary bodies.

A vehicle of a fourth aspect of the present invention, in the vehicle according to any one of the first to third aspects of the present invention, further includes a control unit that controls a posture of the body so that a kinetic frictional force between one of the first and second rotary bodies at which the occurrence of the slip is detected and the road surface increases, in response to detection of occurrence of the slip by the slip detection unit. This structure enables elimination of a slip.

According to a vehicle of a fifth aspect of the present invention, in the vehicle according to the fourth aspect of the present invention, an amount of control over the posture of the body is determined depending on a magnitude of a difference between the actual measured value and the predicted value of the turning parameter. This structure enables a proper body posture control according to the degree of the slip.

A vehicle of a sixth aspect of the present invention, in the vehicle according to any one of the first to third aspects of the present invention, further includes a control unit that changes a load ratio between the first and second rotary bodies, in response to detection of occurrence of the slip by the slip detection unit. This structure enables an increase in kinetic frictional force between the slipping rotary body and the road surface and also enables elimination of the slip.

According to a vehicle of a seventh aspect of the present invention, in the vehicle according to the sixth aspect of the present invention, the first and second rotary bodies are mounted to the body so that positions thereof relative to the body is movable in a vertical direction, and the control unit causes one of the first and second rotary bodies at which the occurrence of the slip is detected to move upward, in response to detection of the occurrence of the slip by the slip detection unit. This structure enables a large movement of the center-of-mass of the body relative to a movement amount of a position of the vehicle. Thus, the load ratio between the first and second rotary bodies can be changed rapidly and efficiently.

According to a vehicle of an eighth aspect of the present invention, in the vehicle according to the seventh aspect of the present invention, an amount of movement of one of the first and second rotary bodies at which the occurrence of the slip is detected is determined depending on a magnitude of a difference between the actual measured value and the predicted value of the turning parameter. This structure enables a proper control for changing the load ratio according to the degree of the slip.

According to a vehicle of a ninth aspect of the present invention, in the vehicle according to the sixth aspect of the present invention, the control unit changes a posture of the body so that a center-of-mass of the body is positioned close to one of the first and second rotary bodies at which the occurrence of the slip is detected, in response to detection of the occurrence of the slip by the slip detection unit.

A vehicle according to a tenth aspect of the present invention, in the vehicle according to the fourth or sixth aspect of the present invention, includes a drive unit that drives the first and second rotary bodies. The control unit further causes the drive unit to stop applying a driving force to one of the first and second rotary bodies at which the occurrence of the slip is detected, in response to detection of the occurrence of the slip by the slip detection unit. The structure enables rapid elimination of a slip state.

A method according to an eleventh aspect of the present invention is a control method of a vehicle including first and second rotary bodies in contact with a road surface, and a body supported by the first and second rotary bodies, the first and second rotary bodies being arranged so that a straight line connecting between a contact where the first rotary body and the road surface are in contact with each other and a contact where the second rotary body and the road surface are in contact with each other is non-parallel to a back-and-forth direction of the vehicle, and being rotationally driven in the back-and-forth direction of the vehicle. Specifically, the method according to this aspect includes processing for calculating a predicted value of a turning parameter representing a turning amount of the vehicle by use of an output signal of a rotation sensor that detects a physical quantity representing a rotational state of each of the first and second rotary bodies; processing for detecting occurrence of a slip of the first or second rotary body by comparing the predicted value with an actual measured value of the turning parameter obtained by receiving an output signal of a turning sensor that detects a physical quantity representing a turning state of the vehicle on the road surface with which the first and second rotary bodies are in contact; and processing for changing a load ratio between the first and second rotary bodies in response to detection of occurrence of the slip of the first or second rotary body. This method enables detection of the occurrence of the slip of the vehicle and also enables execution of control for eliminating the slip in response to detection of the slip.

According to a method of a twelfth aspect of the present invention, in the method according to the eleventh aspect of the present invention, application of a driving force to one of the first and second rotary bodies at which the occurrence of the slip is detected is stopped in response to detection of the occurrence of the slip of the first or second rotary body. This method enables rapid elimination of the slip state.

Advantageous Effects

According to the present invention, it is possible to provide a vehicle capable of executing processing for eliminating a slip by detecting the occurrence of a slip between rotary bodies and a road surface, and a control method of the vehicle.

EXPLANATION OF REFERENCE 1, 2 VEHICLE
11 VEHICLE BODY
12 SEAT
13 CONTROL LEVER
14 COMPUTER (MCU)
15L, 15R MOTOR
16L, 16R MOTOR DRIVER
17L, 17R ENCODER
18 RATE GYRO
19 BATTERY
20 BODY FRAME
21 BODY
101 PREDICTED VALUE CALCULATION UNIT
102 SLIP DETECTION UNIT
103 STABILIZATION/TRAVELING CONTROLLER
104 WHEEL MOVING MECHANISM
105L, 105R MOTOR
106L, 106R ENCODER
107L, 107R LINEAR MOTION GUIDE
211 BODY BASE
212 BODY UPPER PORTION
213 BODY COUPLING PORTION

BEST MODES FOR CARRYING OUT THE INVENTION

Specific embodiments to which the present invention is applied will be described in detail below with reference to the drawings. Identical components are denoted by identical reference symbols throughout the drawings, and redundant explanation thereof is omitted as appropriate, for clarification of the explanation.

Embodiment 1

Figure 1A:
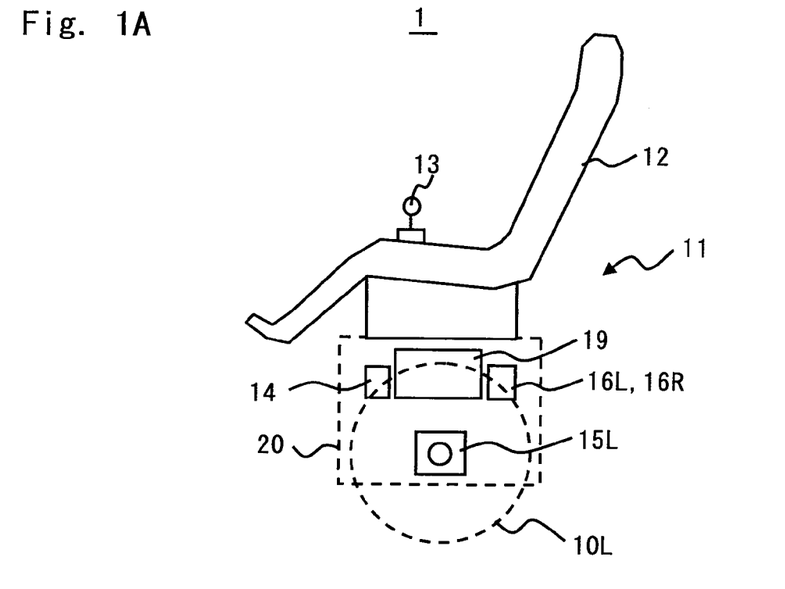
FIG. 1A is a side view showing the external appearance of a vehicle according to an embodiment of the present invention.
Figure 1B:
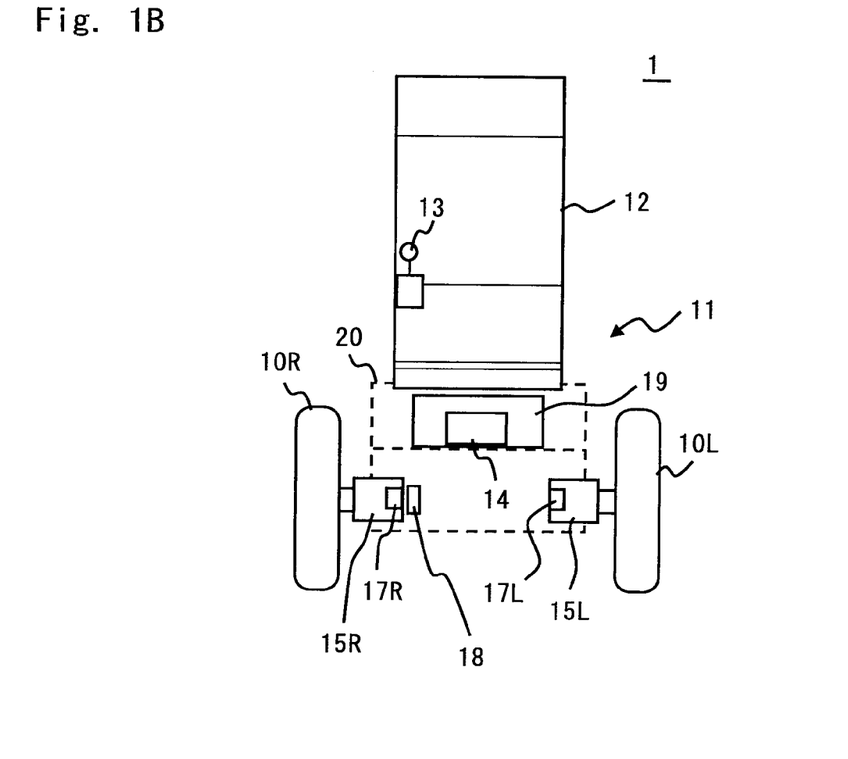
FIG. 1B is a front view showing the external appearance of the vehicle according to an embodiment of the present invention.

An inverted pendulum type vehicle 1 (hereinafter, referred to simply as "vehicle 1") according to this embodiment is a vehicle capable of traveling according to the manipulation by a passenger. FIGS. 1A and 1B each show the external appearance of the vehicle 1 according to this embodiment. FIG. 1A is a side view of the vehicle 1, and FIG. 1B is a front view of the vehicle 1. Note that FIGS. 1A and 1B each illustrate the internal structure of a vehicle body 11 as appropriate, for ease of explanation.

As shown in FIGS. 1A and 1B, left and right wheels 10L and 10R are provided to a lower portion of the vehicle 1. The wheels 10L and 10R are arranged so that a straight line connecting between a contact where the wheel 10L and the road surface are in contact with each other and a contact where the wheel 10R and the road surface are in contact with each other is non-parallel to the back-and-forth direction of the vehicle 1, and are rotationally driven in the back-and-forth direction of the vehicle 1. More specifically, in this embodiment, the straight line connecting the two contacts is perpendicular to the back-and-forth direction of the vehicle 1. Further, the vehicle body 11 is swingable in the back-and-forth direction (pitch direction) of the vehicle 1 with a left-right axis of the vehicle 1 as a center. The vehicle body 11 includes a seat 12, a control lever 13, a computer 14, motors 15L and 15R, motor drivers 16L and 16R, encoders 17L and 17R, a rate gyro 18, a battery 19, and a body frame 20.

The control lever 13 receives an input of a manipulation by a passenger seated in the seat 12, and outputs a manipulation amount signal corresponding to a manipulation amount of the control lever 13 manipulated by the passenger.

The computer 14 executes control so that the vehicle 1 can travel in accordance with the manipulation of the control lever 13 manipulated by the passenger, while maintaining an inverted state of the vehicle body 11. More specifically, the computer 14 calculates a velocity target value or an acceleration target value of the vehicle 1 which is associated with the magnitude of the manipulation amount of the control lever 13, and a target value of a rate of change in tilt angle (tilt angular velocity) from the vertical direction of the vehicle body 11, and carries out inverted state stabilization control and traveling control using these values as control target values, for example.

Moreover, the computer 14 detects the occurrence of a slip between the wheels 10L and 10R and the road surface with which these wheels are in contact, and executes control for eliminating a slip state. Note that details of the contents of the slip detection and the control for eliminating the slip will be described later.

The motors 15L and 15R are coupled to the wheels 10L and 10R, respectively. The motor drivers 16L and 16R drive the motors 15L and 15R, respectively, in accordance with torque command values $\tau_L$ and $\tau_R$ output from the computer 14. The wheels 10L and 10R are driven by the motors 15L and 15R, respectively, thereby enabling the vehicle 1 to travel in the back-and-forth direction of the vehicle 1.

Further, each of the motors 15L and 15R is mounted to the body frame 20 so as to be movable in the vertical direction of the vehicle body 11. To enable the mounting position of each of the motors 15L and 15R to be moved, a ball-screw driven linear motion guide (not shown), for example, may be used for mounting the motors 15L and 15R to the body frame 20. Further, a screw shaft or a nut of the linear motion guide may be rotationally driven, to thereby enable the relative positions between the body frame 20 and the motors 15L and 15R to be varied. The positions for mounting the motors 15L and 15R to the body frame 20 are moved, which makes it possible to move the positions of the wheels 10L and 10R relative to the vehicle body 11 in the vertical direction.

The encoders 17L and 17R are sensors for measuring rotation angles of the motors 15L and 15R, that is, rotation angles $\theta_L$ and $\theta_R$ of the wheels 10L and 10R. The rotation angles per unit time of the wheels 10L and 10R are calculated using the outputs of the encoders 17L and 17R, thereby obtaining rotation angular velocities $\omega_L$ and $\omega_R$ of the wheels 10L and 10R. Further, the use of the rotation angular velocities $\omega_L$ and $\omega_R$ of the wheels 10L and 10R, a radius R of each of the wheels 10L and 10R, and a distance La between the wheels 10L and 10R enables calculation of a predicted value $\omega_P$ of a turning angular velocity of the vehicle 1 about a virtual axis perpendicular to the road surface with which the vehicle 1 is in contact.

The rate gyro 18 is a sensor for determining a turning state of the vehicle 1 on the road surface. In other words, an actual measured value $\omega_M$ of the turning angular velocity of the vehicle 1 about the axis perpendicular to the road surface with which the vehicle 1 is in contact can be obtained using the angular velocity obtained by the rate gyro 18.

Figure 2:
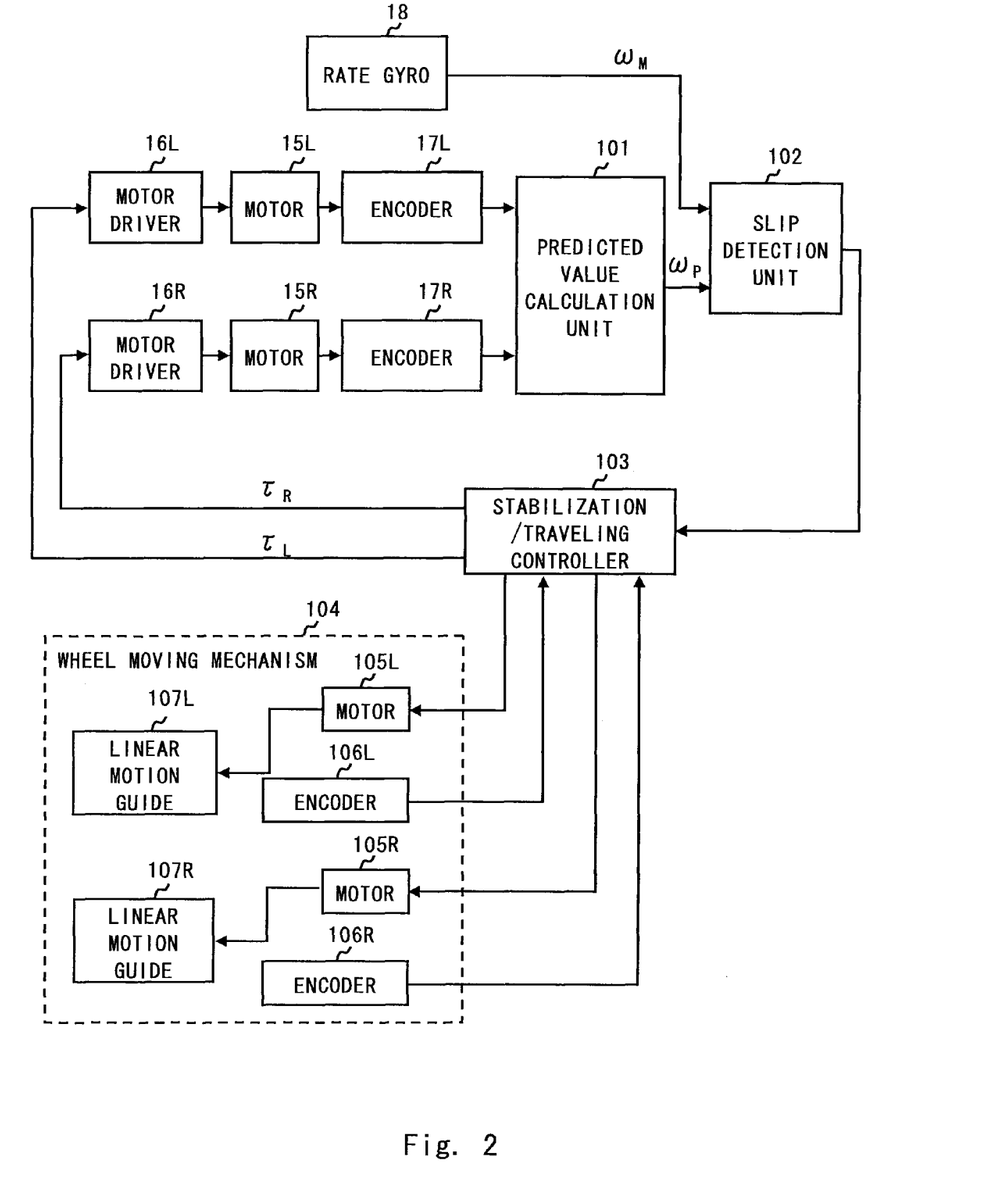
FIG. 2 is a diagram showing a control system of the vehicle according to an embodiment of the present invention.

Next, a control system of the vehicle 1 according to this embodiment will be described below. FIG. 2 shows the control system of the vehicle 1 relating to the detection of slip of the wheels 10L and 10R and the control for suppressing the slip. In FIG. 2, a predicted value calculation unit 101 receives the rotation angles $\theta_L$ and $\theta_R$ of the wheels 10L and 10R, which are measured by the encoders 17L and 17R, to calculate the predicted value $\omega_P$ of the turning angular velocity of the vehicle 1.

Figure 3:
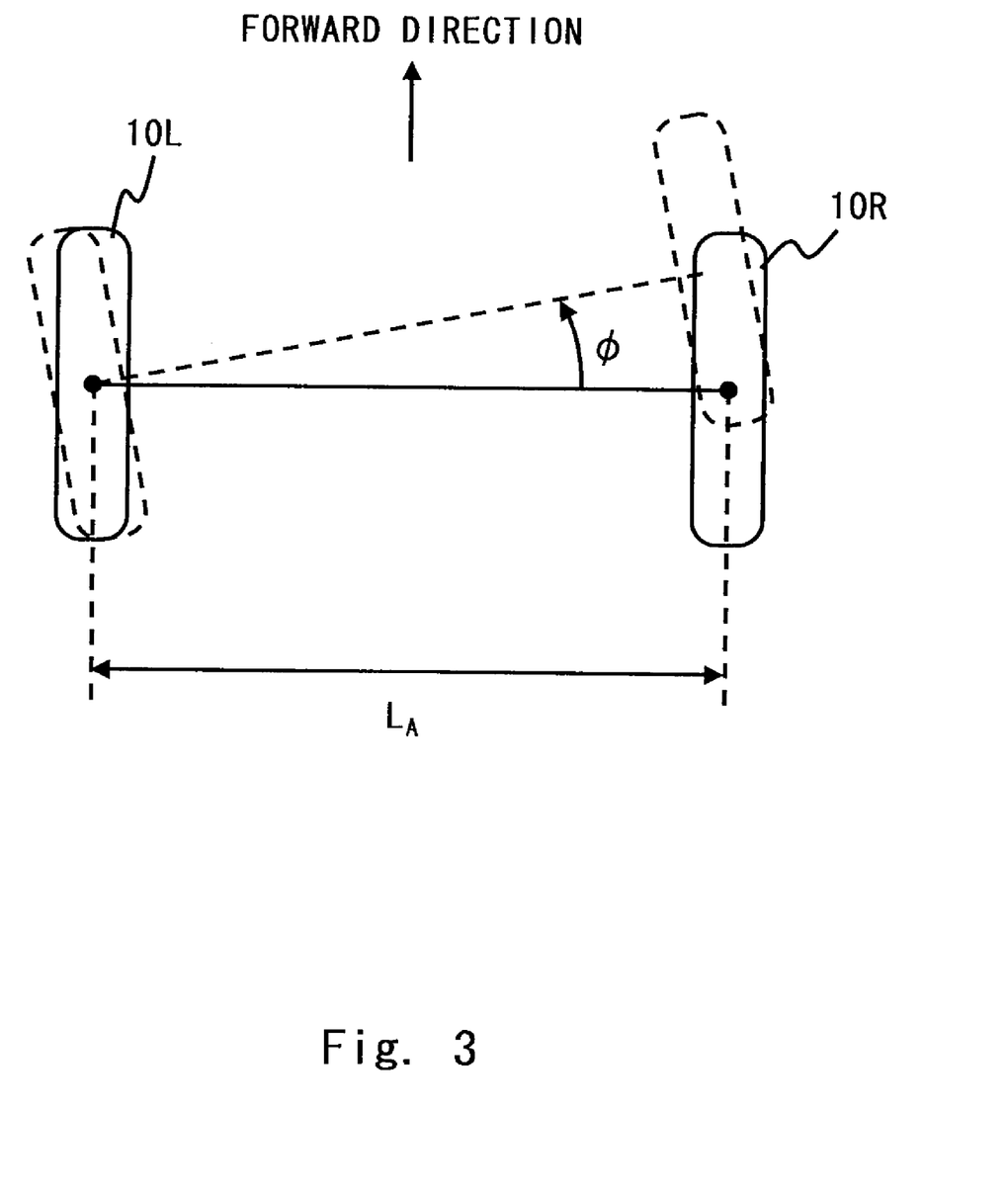
FIG. 3 is a diagram illustrating the principle of slip detection.

Referring now to FIG. 3, assuming that a distance between the wheels 10L and 10R is represented by $L_A$, a turning angle $\phi$ of the vehicle 1 about the axis perpendicular to the road surface is expressed by the following formula (1). Note that FIG. 3 is a plan view of the wheels 10L and 10R included in the vehicle 1 when viewed from the top. Further, in the formula (1), R represents a radius of each of the wheels 10L and 10R. Accordingly, the predicted value $\omega_P$ of the turning angular velocity of the vehicle 1 can be calculated by the following formula (2).

$$\phi \cong \frac{R}{L_A}(\theta_R - \theta_L) \quad (1)$$

$$\omega_P = \frac{d\phi}{dt} \cong \frac{R}{L_A}(\dot\theta_R - \dot\theta_L) \quad (2)$$

A slip detection unit 102 receives the actual measured value $\omega_M$ of the turning angular velocity of the vehicle 1, which is obtained by the rate gyro 18, and the predicted value $\omega_P$ calculated by the predicted value calculation unit 101, and compares these values, thereby detecting the occurrence of a slip of the wheels 10L and 10R. Specifically, for example, a difference between the actual measured value $\omega_M$ and the predicted value $\omega_P$, i.e., $\Delta\omega=\omega_M-\omega_P$ may be calculated, and when the absolute value of $\Delta\omega$ thus calculated is greater than a predetermined threshold value Thd, it may be determined that a slip has occurred. Note that it can be determined which of the wheels 10L and 10R has slipped, according to positive or negative of $\Delta\omega$. In other words, according to the above-mentioned definition of $\Delta\omega$, when $\Delta\omega$ is positive, it can be determined that the wheel 10R has slipped. Meanwhile, when $\Delta\omega$ is negative, it can be determined that the wheel 10L has slipped. Further, it is obvious that the larger the absolute value of $\Delta\omega$ is, the larger the degree of the slip is.

A stabilization/traveling controller 103 is a control unit that executes the inverted state stabilization control and traveling control of the vehicle 1. Specifically, assuming that a target velocity or target acceleration determined depending on the manipulation amount of the control lever 13, a tilt angular velocity of the vehicle body 11, and the like are set as control target values, the torque command values $\tau_L$ and $\tau_R$ for the motor drivers 16L and 16R are calculated so that these control errors are brought close to zero.

Further, the stabilization/traveling controller 103 executes control for eliminating the slip state in response to the detection of the slip occurrence of the wheel 10L or 10R by the slip detection unit 102. More specifically, in this embodiment, it is assumed that linear motion guides 107L and 107R for supporting the motors 15L and 15R, motors 105L and 105R for rotationally driving the screw shafts or nuts of the linear motion guides 107L and 107R, and encoders 106L and 106R for measuring the amount of rotation of each of the motors 105L and 105R are provided to the vehicle 1 as a wheel moving mechanism 104. Further, the stabilization/traveling controller 103 outputs the torque command values to the motors 105L and 105R to tilt the vehicle body 11 by variations in the mounting positions of the wheels 10L and 10R, thereby changing a load ratio between the wheels 10L and 10R. Note that, since the magnitude of the absolute value of $\Delta\omega$ represents a degree of a slip, a variation of the load ratio between the wheels 10L and 10R may be determined depending on the magnitude of $\Delta\omega$.

Furthermore, the stabilization/traveling controller 103 sets the torque command value of a slipping one of the wheels 10L and 10R to zero in response to the detection of the slip occurrence by the slip detection unit 102.

Figure 4A:
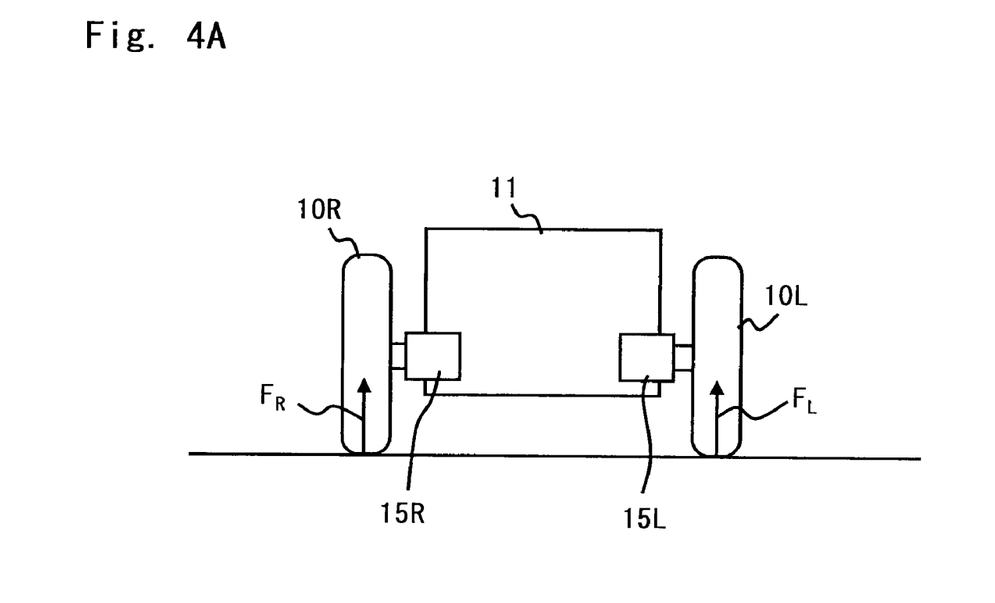
FIG. 4A is a diagram illustrating body control for suppressing a slip occurring in the vehicle according to an embodiment of the present invention.
Figure 4B:
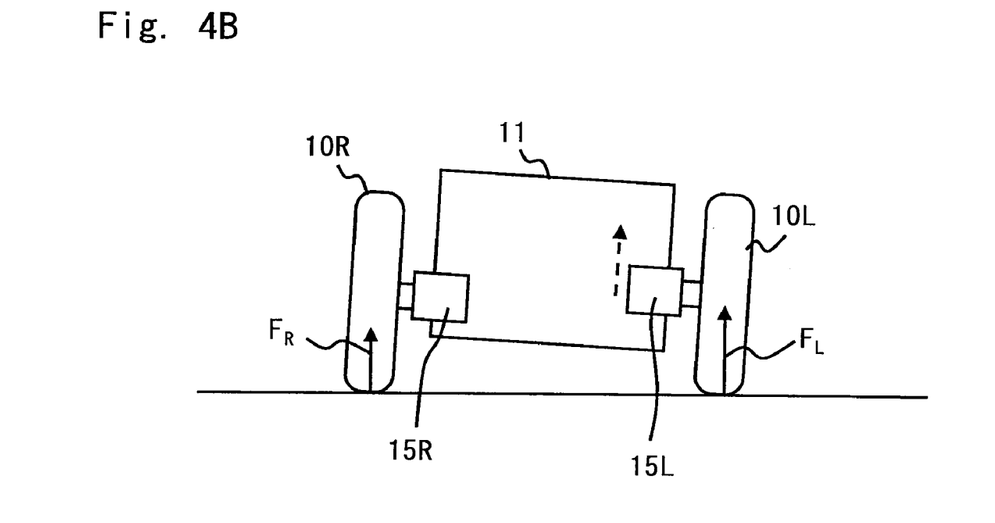
FIG. 4B is a diagram illustrating body control for suppressing a slip occurring in the vehicle according to an embodiment of the present invention.

Referring to FIGS. 4A and 4B, a description is given of the principle of eliminating a slip according to this embodiment. FIG. 4A shows a state where the left and right wheels 10L and 10R are mounted to positions with the same height relative to the vehicle body 11. In this state, the loads on the wheels 10L and 10R are equal. Accordingly, the magnitudes of normal forces $F_L$ and $F_R$ applied from the road surface to the wheels 10L and 10R are equal in theory.

Meanwhile, in the case where the wheel 10L has slipped, the mounting position of the wheel 10L may be moved to a position relatively higher than the wheel 10R as shown in FIG. 4B. As a result, the vehicle body 11 is tilted to the wheel 10L side, which increases the load on the wheel 10L. In other words, as the normal force $F_L$ applied from the road surface to the wheel 10L increases, the kinetic frictional force between the wheel 10L and the road surface increases. Accordingly, the slip of the wheel 10L can be eliminated.

Note that, in FIG. 2 showing the configuration of the control system, only the components necessary for the detection of the slip of the vehicle 1 and the control for eliminating the slip are illustrated for ease of explanation. That is, in addition to the components shown in FIG. 2, a controller for controlling the posture and traveling of the vehicle 1 and a sensor may be added to the vehicle 1 if necessary, as a matter of course.

The above-mentioned processing of each of the predicted value calculation unit 101, the slip detection unit 102, and the stabilization/traveling controller 103 can be realized using the computer 14. Specifically, a program for causing the computer 14 to execute the processing shown in FIG. 5 may be carried out in response to timer interrupts occurring at predetermined time intervals.

Figure 5:
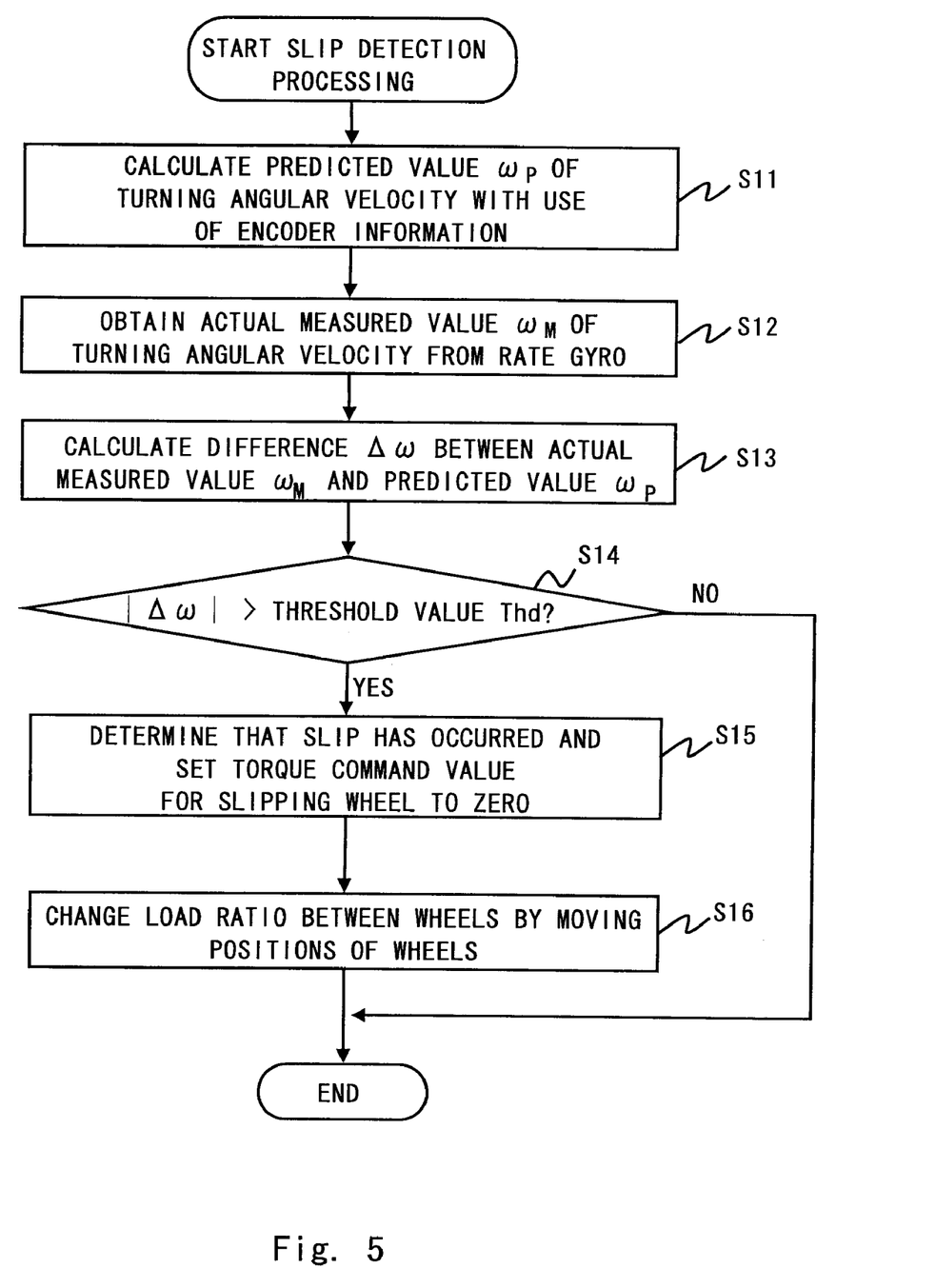
FIG. 5 is a flowchart showing slip detection processing in the vehicle according to an embodiment of the present invention.

In Step S11 of a flowchart shown in FIG. 5, the predicted value $\omega_P$ of the turning angular velocity is calculated using measurement information of the wheel rotation angles $\theta_L$ and $\theta_R$ obtained by the encoders 17L and 17R. In Step S12, the actual measured value $\omega_M$ of the turning angular velocity is obtained from the rate gyro 18. Note that the order of Steps S11 and S12 to be executed is determined for descriptive purposes, and the order of execution may be reversed or the steps may be executed in parallel.

In Step S13, the difference $\Delta\omega$ between the actual measured value $\omega_M$ and the predicted value $\omega_P$ is calculated. In Step S14, the calculated $\Delta\omega$ is compared with the predetermined threshold value Thd, and when the absolute value of Δω is greater than the threshold value Thd, it is determined that a slip has occurred. Note that the magnitude of the threshold value Thd may be determined in view of a measuring error of each of the encoders 17L and 17R and the rate gyro 18.

In the case where it is determined in Step S14 that a slip has occurred, assuming that the torque command value for the slipping wheel is zero, the application of a driving force to the motor 15L or 15R by the motors 15L and 15R is stopped (Step S15). Further, in Step S16, the wheel mounting positions are moved so that the mounting position of a slipping one of the wheels 10L and 10R relative to the vehicle body 11 becomes relatively higher than the mounting position of the other wheel, thereby changing the load ratio between the wheels 10L and 10R.

As described above, the vehicle 1 according to this embodiment compares the actual measured value $\omega_M$ of the turning angular velocity of the vehicle 1, which is obtained by the rate gyro 18, with the predicted value $\omega_P$ of the turning angular velocity predicted based on the rotation angle of each of the wheels 10L and 10R, thereby detecting the occurrence of the slip of the wheels 10L and 10R included in the vehicle 1. Thus, the occurrence of the slip of the vehicle 1 serving as an inverted pendulum type vehicle can be detected, and the control for eliminating the slip can be executed.

Note that the principle of the slip detection according to an embodiment of the present invention can also be applied to a case where the vehicle 1 travels along a slope. In this case, a three-axis rate gyro may be used as the rate gyro 18. A turning angular velocity about a given axis can be obtained using measurement information of the three-axis rate gyro. Further, a tilt angle sensor for measuring a tilt angle of the vehicle body 11 may be mounted to the vehicle 1, and the actual measured value of the turning angular velocity about the axis perpendicular to the road surface may be obtained by the coordinate transformation according to the tilt angle of the vehicle body 11. This facilitates a comparison between the predicted value $\omega_P$ of the turning angular velocity calculated using the rotation angles $\theta_L$ and $\theta_R$ of the wheels 10L and 10R, and the actual measured value of the turning angular velocity.

Embodiment 2

A vehicle 2 according to this embodiment differs from the vehicle 1 according to the embodiment 1 in that a mechanism for moving the center-of-mass of a body 21 by moving a part of the body 21 so as to change the load ratio between the wheels 10L and 10R is employed. Note that the inverted state stabilization control, traveling control, and control for detecting a slip in the vehicle 2 are similar to those of the embodiment 1, so a detailed description of the controls is omitted.

Figure 6A:
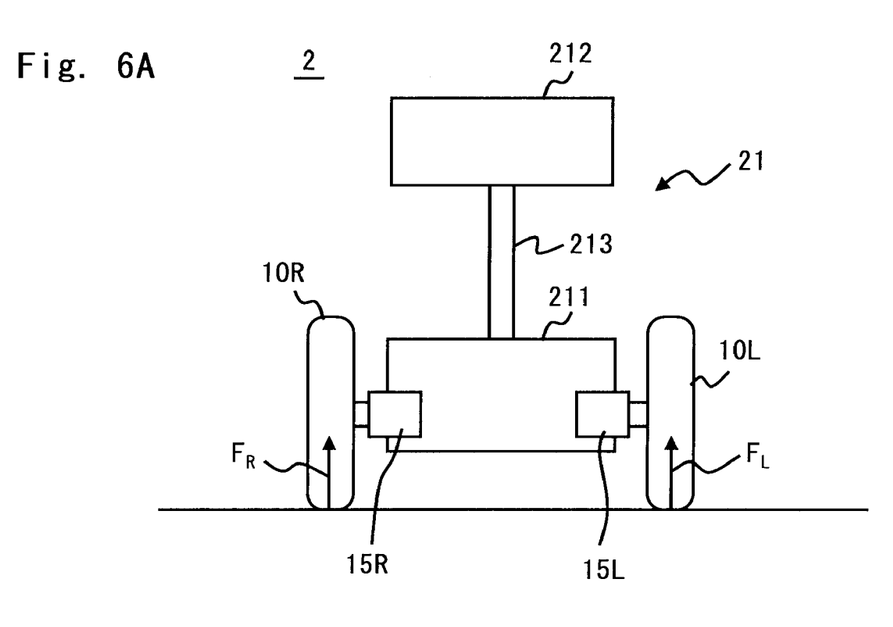
FIG. 6A is a diagram illustrating body control for suppressing a slip occurring in the vehicle according to an embodiment of the present invention.

FIG. 6A shows the external appearance of the vehicle 2. The body 21 shown in FIG. 6A includes a body base 211, a body upper portion 212, and a body coupling portion 213. The body base 211 is supported by the wheels 10L and 10R so as to be swingable in the back-and-forth direction (pitch direction) of the vehicle 2 with a left-right axis of the vehicle 2 as a center. The body coupling portion 213 couples the body base 211 and the body upper portion 212 to each other. The body upper portion 212 is slidable in the right-left direction of the vehicle 2.

The stabilization/traveling controller 103 included in the vehicle 2 executes control for eliminating the slip state in response to the detection of the slip of the wheel 10L or 10R by the slip detection unit 102. More specifically, the stabilization/traveling controller 103 allows the body upper portion 212 to slide to the side of a slipping one of the wheels 10L and 10R.

Figure 6B:
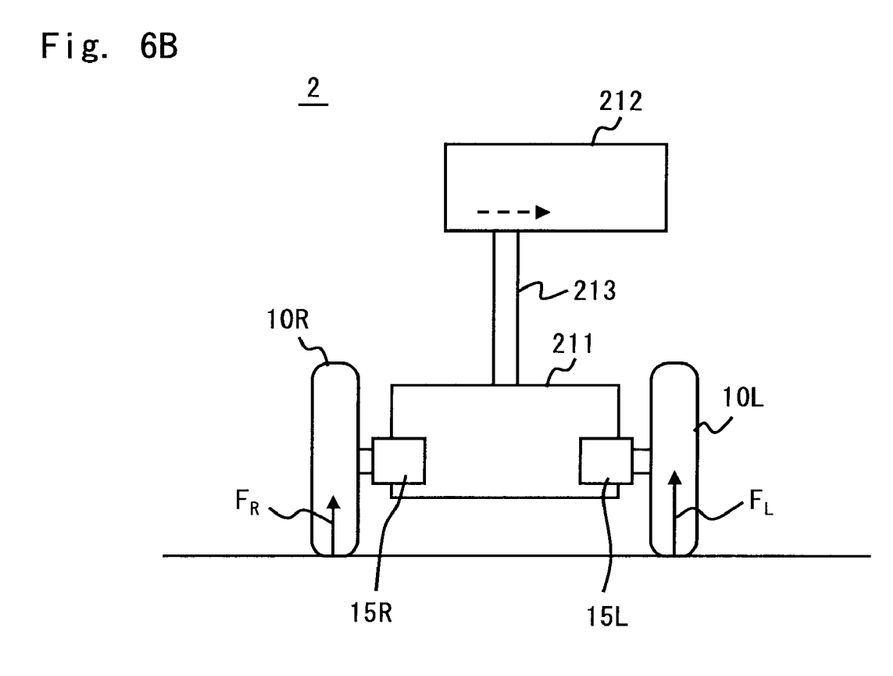
FIG. 6B is a diagram illustrating body control for suppressing a slip occurring in the vehicle according to an embodiment of the present invention.

For example, in the case where the wheel 10L has slipped, the body upper portion 212 is allowed to slide to the wheel 10L side as shown in FIG. 6B. As a result, the center-of-mass of the body 21 is positioned close to the wheel 10L side, which increases the load on the wheel 10L. In other words, as the normal force $F_L$ applied from the road surface to the wheel 10L increases, the kinetic frictional force between the wheel 10L and the road surface increases. Accordingly, the slip of the wheel 10L can be eliminated.

Other Modes of the Invention

In the modes of the invention 1 and 2, the actual measured value and the predicted value of the turning angular velocity of the vehicle 1 are compared to thereby detect the slip occurrence. The turning angular velocity, however, is merely an example of the turning parameters for use in the detection of the slip occurrence. For example, the turning angle and turning amount of each of the moving bodies 1 and 2 about the axis perpendicular to the road surface may be used as the turning parameters, in place of the turning angular velocity. When the turning angle of each of the moving bodies 1 and 2 is used as the turning parameter, the measurement information obtained by the rate gyro 18 may be integrated to calculate an azimuth of the vehicle 1. Alternatively, an azimuth sensor may be mounted to the vehicle 1 in place of the rate gyro 18 so that the turning angle of each of the moving bodies 1 and 2 can be obtained by the azimuth sensor.

Further, in the modes of the invention 1 and 2, the application of a driving force to one of the wheels 10L and 10R at which a slip is detected is stopped. A slip occurs at the wheels 10L and 10R occurs when a driving torque for the wheels 10L and 10R exceeds a product of the wheel radius R and the kinetic frictional force. This provides an advantage in that the slip state can be rapidly eliminated by reducing the driving torque of the slipping wheel. However, instead of stopping the driving force applied to the wheel at which the slip is detected, the driving force may be set to be smaller than that at the time of slip occurrence. Alternatively, the driving force applied to the wheel at which the slip is detected may be gradually reduced step by step. More alternatively, if the slip can be eliminated simply by changing the load ratio between the wheels 10L and 10R, there is no need to execute control for reducing the driving force applied to the wheel at which the slip is detected.

Further, in the embodiment 1, the positions for mounting the motors 15L and 15R to the vehicle body 11 are moved vertically, thereby changing the positions of the wheels 10L and 10R relative to the vehicle body 11. However, the structure for changing the positions of the wheels 10L and 10R relative to the vehicle body 11 is not limited to the specific structures shown in the modes of the invention 1 and 2, as a matter of course. For example, in the case where the wheels 10L and 10R are mounted to the vehicle body 11 through an independent suspension type suspension, the positions of the wheels 10L and 10R relative to the vehicle body 11 may be changed by vertically moving the suspension.

Further, in the modes of the invention 1 and 2, though the description has been made of a specific example in which the present invention is applied to the inverted pendulum type vehicle which allows a person to ride thereon, the present invention can also be applied to other moving bodies. For example, the present invention can be applied to a vehicle that is incorporated into the lower body of a robot as a moving mechanism for a humanoid robot, that is, a vehicle in which the upper body of the humanoid robot is mounted to the body, a vehicle that moves with carrying objects such as baggage loaded thereon, and the like.

Further, in the moving bodies 1 and 2 according to the modes of the invention 1 and 2, the axes of rotation of the two wheels 10L and 10R are coaxially disposed, except for the case where the vehicle body 11 is tilted by vertical movement of the mounting positions of the wheels 10L and 10R. In other words, a straight light connecting between a contact where the wheel 10L and the road surface are in contact with each other and a contact where the wheel 10R and the road surface are in contact with each other is perpendicular to the back-and-forth direction of the moving bodies 1 and 2. Yet, the present invention can also be applied to a vehicle in which the axes of rotation of the wheels 10L and 10R are not coaxially disposed, in other words, a vehicle in which the straight line connecting between the contact where the wheel 10L and the road surface are in contact with each other and the contact where the wheel 10R and the road surface are in contact with each other is not perpendicular to the back-and-forth direction of the moving bodies 1 and 2.

Further, in the modes of the invention 1 and 2, though the moving bodies 1 and 2 each include the two wheels 10L and 10R, the present invention is not limited to such a structure but can be applied to other structures. For example, a rotary body having a spherical shape or cylindrical shape with a circular cross-section may be used in place of the wheels. Alternatively, each of the moving bodies 1 and 2 may include three or more wheels.

Furthermore, the present invention is not limited to the above-mentioned embodiments, and various modifications can be made without departing from the gist of the present invention as described above.

INDUSTRIAL APPLICABILITY

The present invention can be applied to a vehicle that travels with two or more rotary bodies that are rotationally driven.

The invention claimed is:

1. A vehicle including first and second rotary bodies in contact with a road surface, and a vehicle body supported by the first and second rotary bodies, the first and second rotary bodies being arranged so that a straight line connecting between a contact where the first rotary body and the road surface are in contact with each other and a contact where the second rotary body and the road surface are in contact with each other is non-parallel to a back-and-forth direction of the vehicle, and being rotationally driven in the back-and-forth direction of the vehicle, the vehicle comprising:
a rotation sensor that detects a rotational state of each of the first and second rotary bodies;
a turning sensor that detects a physical quantity representing a turning state of the vehicle on the road surface, and outputs a signal corresponding to a magnitude of the detected physical quantity;
a calculation unit that calculates a predicted value of a turning parameter representing a turning amount of the vehicle by use of a difference between first and second physical quantities which represent the rotational states of the first and second rotary bodies, respectively, and which are obtained based on an output of the rotation sensor; and
a slip detection unit that detects occurrence of a slip of the first or second rotary body by comparing the predicted value with an actual measured value of the turning parameter obtained by receiving an output signal of the turning sensor.

2. The vehicle according to claim 1, wherein the turning parameter is a turning angle or a turning angular velocity of the vehicle with a virtual axis perpendicular to the road surface as a center.

3. The vehicle according to claim 1, wherein the rotation sensor is an encoder that detects an amount of rotation, a rotation angle, or a rotational position of each of the first and second rotary bodies.

4. The vehicle according to claim 1, further comprising a control unit that controls a posture of the vehicle body so that a kinetic frictional force between one of the first and second rotary bodies at which the occurrence of the slip is detected and the road surface increases, in response to detection of occurrence of the slip by the slip detection unit.

5. The vehicle according to claim 4, wherein an amount of control over the posture of the vehicle body is determined depending on a magnitude of a difference between the actual measured value and the predicted value of the turning parameter.

6. The vehicle according to claim 1, further comprising a control unit that changes a load ratio between the first and second rotary bodies, in response to detection of occurrence of the slip by the slip detection unit.

7. The vehicle according to claim 6, wherein
the first and second rotary bodies are mounted to the vehicle body so that positions thereof relative to the vehicle body is movable in a vertical direction, and
the control unit causes one of the first and second rotary bodies at which the occurrence of the slip is detected to move upward, in response to detection of the occurrence of the slip by the slip detection unit.

8. The vehicle according to claim 7, wherein an amount of upward movement of one of the first and second rotary bodies at which the occurrence of the slip is detected is determined depending on a magnitude of a difference between the actual measured value and the predicted value of the turning parameter.

9. The vehicle according to claim 6, wherein the control unit changes a posture of the vehicle body so that a center-of-mass of the vehicle body is positioned close to one of the first and second rotary bodies at which the occurrence of the slip is detected, in response to detection of the occurrence of the slip by the slip detection unit.

10. The vehicle according to claim 4, comprising a drive unit that drives each of the first and second rotary bodies,
wherein the control unit further causes the drive unit to stop applying a driving force to one of the first and second rotary bodies at which the occurrence of the slip is detected, in response to detection of the occurrence of the slip by the slip detection unit.

11. A control method of a vehicle including first and second rotary bodies in contact with a road surface, and a vehicle body supported by the first and second rotary bodies, the first and second rotary bodies being arranged so that a straight line connecting between a contact where the first rotary body and the road surface are in contact with each other and a contact where the second rotary body and the road surface are in contact with each other is non-parallel to a back-and-forth direction of the vehicle, and being rotationally driven in the back-and-forth direction of the vehicle, the control method comprising:
calculating a predicted value of a turning parameter representing a turning amount of the vehicle by use of a difference between first and second physical quantities representing rotational states of the first and second rotary bodies, respectively;

detecting occurrence of a slip of the first or second rotary body by comparing the predicted value with an actual measured value of the turning parameter obtained by receiving an output signal of a turning sensor that detects a physical quantity representing a turning state of the vehicle on the road surface; and changing, via a computer, a load ratio between the first and second rotary bodies in response to detection of the occurrence of the slip of the first or second rotary body.

12. The control method according to claim 11, wherein application of a driving force to one of the first and second rotary bodies at which the occurrence of the slip is detected is stopped in response to detection of the occurrence of the slip of the first or second rotary body.

* * * * *